United States Patent
Koganehira

(10) Patent No.: US 7,767,735 B2
(45) Date of Patent: *Aug. 3, 2010

(54) INK COMPOSITION, INK SET, RECORDING PROCESS AND RECORDED IMAGE

(75) Inventor: Shuichi Koganehira, Nagano (JP)

(73) Assignee: Seiko Epson Corporation, Tokyo (JP)

(*) Notice: Subject to any disclaimer, the term of this patent is extended or adjusted under 35 U.S.C. 154(b) by 1177 days.

This patent is subject to a terminal disclaimer.

(21) Appl. No.: 11/215,808

(22) Filed: Aug. 30, 2005

(65) Prior Publication Data

US 2006/0235108 A1 Oct. 19, 2006

(30) Foreign Application Priority Data

Sep. 1, 2004 (JP) .................... P.2004-253835

(51) Int. Cl.
*B32B 27/00* (2006.01)
*B32B 27/40* (2006.01)
*B41J 2/01* (2006.01)
*B41J 2/175* (2006.01)
*C08F 8/30* (2006.01)
*C08F 283/04* (2006.01)
*C08G 18/08* (2006.01)
*C08J 3/00* (2006.01)
*C08K 3/20* (2006.01)
*C08L 75/00* (2006.01)
*C09D 11/00* (2006.01)
*G01D 11/00* (2006.01)

(52) U.S. Cl. .................. 523/160; 106/31.136; 347/1; 347/85; 347/100; 428/423.1; 523/161; 524/507; 525/123; 525/455

(58) Field of Classification Search .......... 523/160, 523/161; 524/507, 591, 839, 840; 525/123, 525/455; 106/31.136, 31.13; 347/1, 85, 347/100; 428/423.1

See application file for complete search history.

(56) References Cited

U.S. PATENT DOCUMENTS

2004/0242726 A1 * 12/2004 Waki et al. .................. 523/160
2005/0228069 A1 * 10/2005 Kataoka et al. ............. 523/160

FOREIGN PATENT DOCUMENTS

| JP | 3088588 | | 7/2000 |
| JP | 2002-356637 | | 12/2002 |
| WO | WO 03/062331 | * | 7/2003 |
| WO | 03/097753 | | 11/2003 |

OTHER PUBLICATIONS

Sun Chemical Corporation Pigments Division.-Free Online Library, http://www.thefreelibrayr.com/Sun+Chemical+Corporation+Pigments+division-a061887835, c. 2000.*
Computer Generated English Translation of JP 3088588 dated Jul. 14, 2000.
Patent Abstracts of Japan and Computer Generated English Translation of JP 2002-356637 dated Dec. 13, 2002.

* cited by examiner

*Primary Examiner*—Patrick D Niland
(74) *Attorney, Agent, or Firm*—Ladas and Parry LLP

(57) ABSTRACT

Provided is an ink composition containing a pigment, an aqueous medium, a copolymer resin of a hydrophobic monomer and a hydrophilic monomer, and a urethane resin, wherein the weight ratio of the copolymer resin to the urethane resin (copolymer resin/urethane resin) being from 1/2 to 2/1, and wherein the pigment having an area average particle diameter of from 150 to 350 nm. Also disclosed are a production process of the ink composition, an ink set and a recording process using the ink composition, and a recorded image formed by the recording process.

15 Claims, 2 Drawing Sheets

INK COMPOSITION, INK SET, RECORDING PROCESS AND RECORDED IMAGE

FIELD OF THE INVENTION

The present invention relates to an ink composition, an ink set, a recording process and a recorded image. According to the invention, a recorded image can be prevented from suffering from optical thin film interference to avoid glaring dazzle even when the image receives strong illumination at a short distance, whereby a recorded image excellent in gloss and sharpness can be obtained.

BACKGROUND OF THE INVENTION

In the ink-jet recording process, small droplets of an ink composition are ejected and attached to a recording medium, such as paper, to effect printing. According to innovative progress of ink-jet recording techniques in recent years, the ink-jet recording process is being used in the field of high definition printing, which has been realized only by silver salt photography and offset printing. In view of the trend, such an ink-jet recording medium is developed that has high gloss equivalent to photographic paper and coated paper used in the field of silver salt photography and offset printing.

As an ink for recording a character and/or an image on the ink-jet recording medium having high gloss, an aqueous ink is ordinarily used which contains water as a major component with a colorant, a resin and other various additives added thereto. While the colorant may be a dye or a pigment, a pigment is favorably used from the standpoint of weather resistance, such as light resistance, gas resistance, water resistance and humidity resistance. Accordingly, the demand of a pigment ink is being increased, and development thereof is promoted to utilize the advantages of pigments. In order to improve the fixing property of the pigment and the gloss on a recording medium, an aqueous pigment ink containing a resin component has been used (as described, for example, in Patent Documents 1 and 2).

Upon forming a recorded image with high gloss with an aqueous ink containing a resin component, a recorded image ink layer on the surface of the recording medium is produced from a pigment layer and formed thereon a sole resin layer containing only a resin, so as to realize high gloss. For example, as shown in FIG. 2, an aqueous pigment ink is ejected to a surface of a recording medium 1, and after the solvent component penetrates through the interior of the recording medium 1, an ink layer 10 as a recorded image is formed on the surface of the recording medium 1. In the interior of the ink layer 10, the pigment particles 21 are accumulated in the closest packing state to from a pigment layer 2. The resin component contained in the aqueous pigment ink fills up the gaps among the pigment particles 21 in the pigment layer 2, and the entire pigment layer 2 is completely covered with a resin 31 to form a sole resin layer 3 containing substantially no pigment particle on the pigment layer 2. Furthermore, the surface 4 of the sole resin layer 3 can be extremely smooth to realize high gloss.

Patent Document 1: Japanese Patent No. 3,088,588
Patent Document 2: WO 03/097753

The recorded image shown in FIG. 2 can realize gloss with high quality, but the inventors have found that upon irradiating the image with strong light from a short distance, the image includes such problems that uncomfortable feeling is formed due to strong glare, and thin film interference is formed by the sole resin layer. For example, in the case where the recorded image shown in FIG. 2 is irradiated with illumination of a naked light bulb or naked fluorescent light, a clear mirror image of the naked light bulb or naked fluorescent light is formed on the surface 4 of the ink layer 4, and its strong reflected light causes an observer with uncomfortable feeling. The ink layer 10 shown in FIG. 2 has a multilayer structure containing the pigment layer 2 and the sole resin layer 3 to form thin film interference by the sole resin layer 3, and thus the reflected light is separated into weak components and strong components depending on wavelength, which brings about incorrectness in color reproducibility.

SUMMARY OF THE INVENTION

Accordingly, an object of the invention is to provide such an ink composition that does no form uncomfortable feeling due to strong glare and does not form thin film interference.

Other objects and effects of the invention will be apparent from the following description.

The objects of the invention have been accomplished by providing the following ink composition.

The invention relates to an ink composition containing a pigment, an aqueous medium, a copolymer resin of a hydrophobic monomer and a hydrophilic monomer, and a urethane resin, wherein a weight ratio of the copolymer resin to the urethane resin (copolymer resin/urethane resin) is from 1/2 to 2/1, and wherein the pigment has an area average particle diameter of from 150 to 350 nm.

In a preferred embodiment of the invention, the pigment has a volume average particle diameter of from 100 to 600 nm.

In another preferred embodiment of the invention, the copolymer resin is a styrene-(meth)acrylic acid copolymer resin, a styrene-methylstyrene-(meth)acrylic acid copolymer resin, a styrene-maleic acid copolymer resin, a (meth)acrylic acid-(meth)acrylate copolymer resin, or a styrene-(meth)acrylic acid-(meth)acrylate copolymer resin, and in particular, the urethane resin has a urethane bond and/or an amide bond, and an acidic group.

In still another preferred embodiment of the invention, a weight ratio of the solid content of the pigment to the total solid content of the copolymer resin and the urethane resin (pigment/resins) is from 100/20 to 100/80.

In a further preferred embodiment of the invention, the copolymer resin and the urethane resin are crosslinked with an epoxy resin having a glycidyl ether as a skeleton or a resin having an oxazoline group, as a crosslinking agent. In this case particularly, it is preferred that the crosslinking agent is a resin capable of reacting with a carboxyl group, and the crosslinking agent is added in an amount of from 1 to 50% by weight based on the urethane resin.

In a still further preferred embodiment of the invention, the ink composition further contains an alkanolamine compound or an alkylamine compound, as a pH adjusting agent.

In a still further preferred embodiment of the invention, the ink composition has pH of 8.0 or more.

In a still further preferred embodiment of the invention, the ink composition contains the pigment at a content of 10% by weight or less based on the ink composition.

The invention also relates to an ink set containing at least the ink composition.

The invention further relates to an ink set containing plural kinds of the ink compositions, the ink compositions each containing the pigment at a content of 3% by weight or less based on the ink composition.

The invention still further relates to a process for producing an ink composition containing:

a pre-treating step of providing a pigment having a volume average particle diameter of from 350 to 600 nm (pre-treating step);

a step of dispersing the pigment by adding a copolymer resin of a hydrophobic monomer and a hydrophilic monomer (dispersing step); and a post-treating step of crosslinking the copolymer resin by adding a urethane resin and a crosslinking agent (crosslinking step).

The invention still further relates to a recording process containing a step of forming a recorded image on a recording medium by using the ink composition, wherein the formulation of the ink composition and a combination of the ink composition and the recording medium are adjusted in such a manner that the uppermost layer of the recorded image layer formed is covered with a resin layer, and the thickness of a pigment layer formed in the recorded image layer substantially agrees with the total thickness of the recorded image layer.

The invention still further relates to a recorded image formed by the recording process.

The term "area average particle diameter" of the pigment particles referred herein means an average particle diameter that is weighted by area. Specifically, under assumption that particles as one group consist of particles having particle diameters $d_1, d_2, \ldots d_i, \ldots d_k$ at numbers of $n_1, n_2, \ldots n_i, \ldots n_k$, respectively, and that the surface area per one particle is $a_i$, then the area average particle diameter is obtained by the following equation:

Area average particle diameter=$\Sigma(n_i a_i \cdot d_i)/\Sigma(n_i a_i)$

The term "volume average particle diameter" of the pigment particles referred herein means an average particle diameter that is weighted by volume. Specifically, under assumption that particles as one group consist of particles having particle diameters $d_1, d_2, \ldots d_i, \ldots d_k$ at numbers of $n_1, n_2, \ldots n_i, \ldots n_k$, respectively, and that the volume per one particle is $v_i$, then the area average particle diameter is obtained by the following equation:

Volume average particle diameter=$\Sigma(n_i v_i \cdot d_i)/\Sigma(n_i v_i)$

The term "volume 50% diameter" of the pigment particles referred herein is defined as follows. In a particle size distribution of particles as one group, an accumulation curve is obtained with the total volume of the particles in the group being 100%, and the particle diameter at 50% of the accumulation curve is designated as the volume 50% diameter.

The "area average particle diameter", the "volume average particle diameter" and the "volume 50% diameter" can be measured, for example, with a particle size distribution meter (such as Microtrac UPA, produced by Microtrac, Inc. and ELS800, produced by Otsuka Electronics Co., Ltd.).

The terms "particle diameter" and "average particle diameter" of other particles than the pigment particles (such as particles of the copolymer resin and the urethane resin) referred herein mean the volume 50% diameters.

According to the ink composition of the invention, not only a glossy image with high quality can be obtained, but also such a recorded image can be obtained that does no form uncomfortable feeling due to strong glare and does not form thin film interference.

Figure 1:
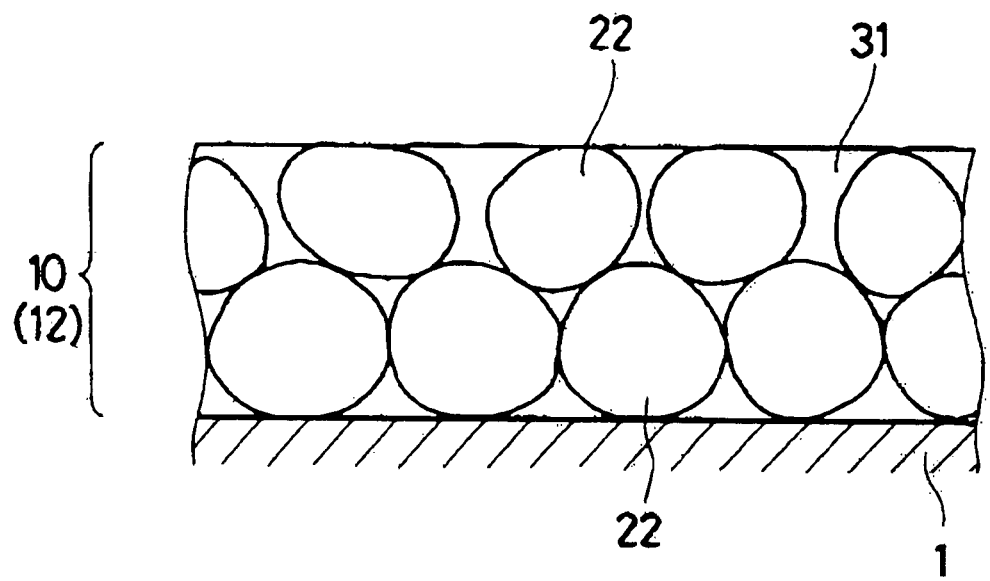
FIG. 1 is a cross sectional view showing schematically a cross sectional structure of an ink layer formed with the ink composition of the invention.

The reference numerals and signs used in the drawings denote the followings, respectively.

| | |
|---|---|
| 1: | Recording medium |
| 2 and 12: | Pigment layer |
| 3: | Sole resin layer |
| 4: | Surface of sole resin layer |
| 10 | Ink layer |
| 21 and 22: | Pigment particle |
| 31: | Resin |
| 41: | Sample recorded image to be evaluated |
| I: | Incident light |
| R: | Reflected light |
| Z: | Scanning direction of printer head |

DETAILED DESCRIPTION OF THE INVENTION

Principals of the Invention

Firstly, the mechanisms by which the ink composition of the invention provides such a recorded image that does no form uncomfortable feeling due to strong glare and does not form thin film interference even when the image receives strong illumination at a short distance will be described with reference to FIGS. 1 and 2. The mechanisms shown below are in the state of inference, and the invention is not limited by the following mechanisms.

As having been described with reference to FIG. 2, a conventional aqueous pigment in containing a resin component for ink-jet recording realizes high gloss by making the pigment particles 21 as fine particles. Specifically, the conventional aqueous pigment ink for realizing high gloss contains pigment particles 21 having an extremely small particle diameter of about 70 nm in terms of an average particle diameter (area average particle diameter), and with an ordinary pigment concentration, a pigment layer 2 having a thickness of about 300 nm is formed with the pigment particles 21 in the closest packing state. The thickness of the ink layer 10 formed with the aqueous pigment ink of this kind on the recording medium 1 is generally about 1 μm. Therefore, the ink layer 10 contains the pigment layer 2 having a thickness of about 300 nm and a sole resin layer 3 having a thickness of about 700 nm, and the sole resin layer 3 thus formed brings about thin film interference and strong reflected light.

On the other hand, in the case where instead of the pigment particles 21 having an extremely small particle diameter of about 70 nm in terms of an average particle diameter (area average particle diameter), a recorded image is formed by using pigment particles 22 having a relatively large particle diameter, for example, about 180 nm, in terms of an average particle diameter (area average particle diameter) at the same concentration, a pigment layer 12 having a thickness of about 1 μm is formed with the pigment particles 22 in the closes packing state as shown in FIG. 1. The thickness of the ink layer 10 formed with the aqueous pigment ink of this kind on the recording medium 1 is generally about 1 μm. Therefore, the ink layer 10 contains no sole resin layer formed therein, and no thin film interference or strong reflected light is formed.

Figure 2:
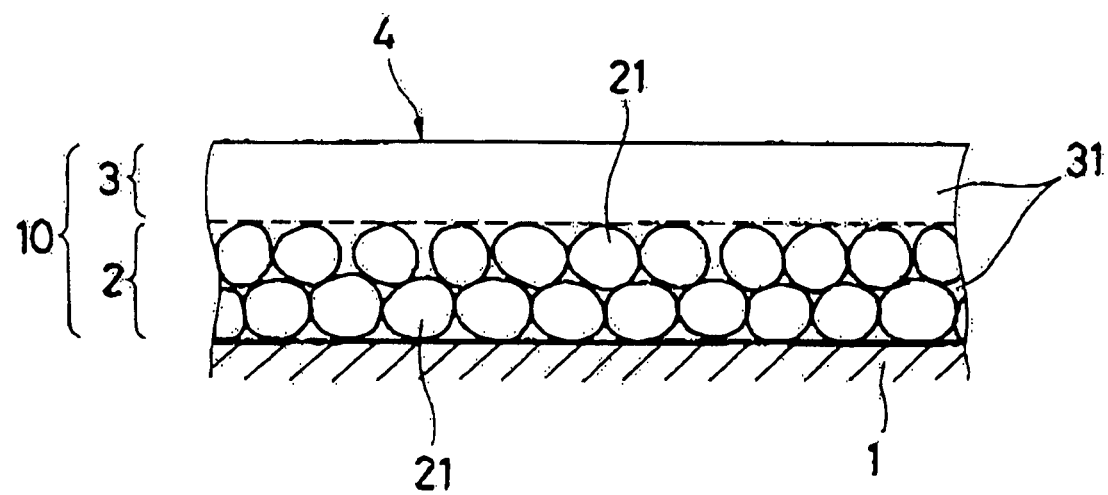
FIG. 2 is a cross sectional view showing schematically a cross sectional structure of an ink layer formed with a conventional ink composition.
Figure 3:
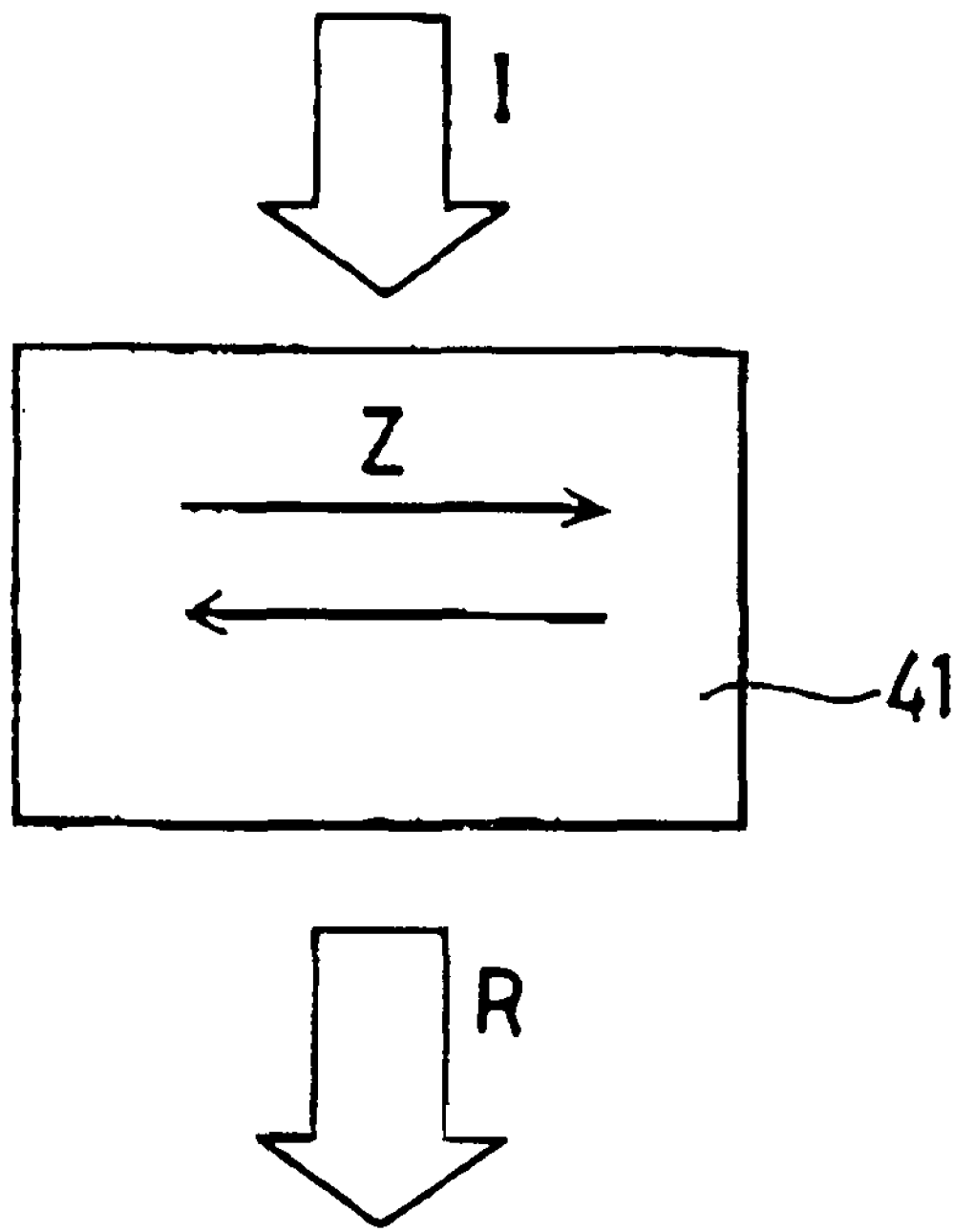
FIG. 3 is an illustrative view showing an irradiation direction of incident light on a recorded image to be evaluated.

In FIGS. 1 and 2, only small numbers of the pigment particles 21 and 22 constituting the pigment layers 12 and 2 are indicated for schematically explaining the cross sectional structure of the ink layers, and practically, larger numbers of pigment particles than those shown in FIGS. 1 and 2 constitute the pigment layers.

Ink Composition

The ink composition of the invention is preferably formed, for example, from a pigment dispersion liquid and an aqueous medium. The pigment dispersion liquid contains, for example, at least a pigment, an aqueous medium, a copolymer resin of a hydrophobic monomer and a hydrophilic monomer, and a urethane resin, at a weight ratio of the copolymer resin to the urethane resin (copolymer resin/urethane resin) of from 1/2 to 2/1. The weights of the resin referred herein means values calculated as solid contents.

The copolymer resin of a hydrophobic monomer and a hydrophilic monomer (hereinafter, simply referred to as a copolymer resin), such as a styrene-acrylic acid copolymer resin, functions mainly as a dispersing resin for dispersing the pigment. The copolymer resin improves the dispersibility by adsorbing on the pigment. The urethane resin functions mainly as a fixing resin for improving gloss, adhesion property and time-lapse stability of a recorded image.

Specific examples of the hydrophobic monomer include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol methacrylate, 1,4-butanediol acrylate, 1,4-butanediol methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methyl styrene and vinyltoluene. These monomers may be used solely or as a mixture of two or more of them.

Specific examples of the hydrophilic monomer include acrylic acid, methacrylic acid, maleic acid and itaconic acid.

The copolymer resin of a hydrophobic monomer and a hydrophilic monomer is preferably at least one of a styrene-(meth)acrylic acid copolymer resin, a styrene-methylstyrene-(meth)acrylic acid copolymer resin, a styrene-maleic acid copolymer resin, a (meth)acrylic acid-(meth)acrylate copolymer resin, and a styrene-(meth)acrylic acid-(meth)acrylate copolymer resin, from the standpoints that gloss and prevention of bronzing of a color image and storage stability of the ink composition are all realized, and a color image further excellent in gloss is obtained.

The copolymer resin may be a resin containing a polymer obtained by reacting styrene with acrylic acid or an acrylate (styrene-acrylic acid resin). The copolymer resin may also be an acrylic acid water soluble resin or a salt thereof with sodium, potassium, ammonium or the like.

The urethane resin is preferably a resin having a urethane bond and/or an amide bond, and an acidic group, from the standpoints that gloss and prevention of bronzing of a color image and storage stability of the ink composition are all realized, and a color image further excellent in gloss is obtained.

The urethane resin is a resin containing a polymer obtained by reacting a diisocyanate compound with a diol compound.

Examples of the diisocyanate compound include an alicyclic diisocyanate compound, such as hexamethyelne diisocyanate and 2,2,4-trimethylhexamethylene diisocyanate, an aromatic diisocyanate compound, such as toluylene diisocyanate and phenylmethane diisocyanate, and modified compounds thereof.

Examples of the diol compound include a polyether compound, such as polyethylene glycol and polypropylene glycol, a polyester compound, such as polyethylene adipate and polybutylene adipate, and a polycarbonate compound.

The urethane resin preferably has a carboxyl group.

The weight ratio of the copolymer resin to the urethane resin (copolymer resin/urethane resin) is preferably from 1/2 to 2/1, and more preferably from 1/1.5 to 1.5/1, from the standpoints that gloss and prevention of bronzing of a color image and storage stability of the ink composition are all realized, and a color image further excellent in gloss is obtained.

The weight ratio of the solid content of the pigment to the total solid content of the copolymer resin and the urethane resin (pigment/resins) is preferably from 100/20 to 100/80, from the standpoints that gloss and prevention of bronzing of a color image and storage stability of the ink composition are all realized, and a color image further excellent in gloss is obtained.

The content of the copolymer resin is preferably from 10 to 50 parts by weight, and more preferably from 10 to 35 parts by weight, per 100 parts by weight of the pigment, from the standpoints that gloss and prevention of bronzing of a color image and storage stability of the ink composition are all realized, and a color image further excellent in gloss is obtained.

The content of the urethane resin is preferably from 10 to 40 parts by weight, and more preferably from 10 to 35 parts by weight, per 100 parts by weight of the pigment, from the standpoints that gloss and prevention of bronzing of a color image and storage stability of the ink composition are all realized, and a color image further excellent in gloss is obtained.

The total amount of the copolymer resin and urethane resin is preferably 80 parts by weight or less, and more preferably 70 parts by weight or less, per 100 parts by weight of the pigment, from the standpoints that gloss and prevention of bronzing of a color image and storage stability of the ink composition are all realized, and a color image further excellent in gloss is obtained.

The acid value of the copolymer resin is preferably from 50 to 320, and more preferably from 100 to 250, from the standpoints that gloss and prevention of bronzing of a color image and storage stability of the ink composition are all realized, and a color image further excellent in gloss is obtained.

The acid value of the urethane resin is preferably from 10 to 300, and more preferably from 20 to 100, from the standpoints that gloss and prevention of bronzing of a color image and storage stability of the ink composition are all realized, and a color image further excellent in gloss is obtained.

The acid value referred herein means an amount of KOH in terms of mg necessary for neutralizing 1 g of the resin.

The weight average molecular weight (Mw) of the copolymer resin is preferably from 2,000 to 30,000, and more preferably from 2,000 to 20,000, from the standpoints that gloss and prevention of bronzing of a color image and storage stability of the ink composition are all realized, and a color image further excellent in gloss is obtained.

The weight average molecular weight (Mw) of the urethane resin is preferably from 100 to 200,000, and more preferably from 1,000 to 50,000, from the standpoints that gloss and prevention of bronzing of a color image and storage stability of the ink composition are all realized, and a color image further excellent in gloss is obtained.

The molecular weight (Mw) can be measured, for example, with GPC (gel permeation chromatography).

The glass transition temperature (Tg, measured according to JIS K6900) of the copolymer resin is preferably 30° C. or more, and more preferably from 50 to 130° C., from the standpoints that gloss and prevention of bronzing of a color image and storage stability of the ink composition are all realized, and a color image further excellent in gloss is obtained.

The glass transition temperature (Tg, measured according to JIS K6900) of the urethane resin is preferably from −50 to 200° C., and more preferably from −50 to 100° C., from the standpoints that gloss and prevention of bronzing of a color image and storage stability of the ink composition are all realized, and a color image further excellent in gloss is obtained.

There are two states of the copolymer resin, i.e., the resin is adsorbed on the pigment or is freely released in the ink composition. The maximum particle diameter of the copolymer resin (in the released state) is preferably 0.3 µm or less, and the average particle diameter thereof (in the released state) is more preferably 0.2 µm or less, and further preferably 0.1 µm or less, from the standpoints that gloss and prevention of bronzing of a color image and storage stability of the ink composition are all realized, and a color image further excellent in gloss is obtained.

There are two states of the urethane resin, i.e., the resin is adsorbed on the pigment or is freely released in the ink composition. The maximum particle diameter of the urethane resin (in the released state) is preferably 0.3 µm or less, and the average particle diameter thereof (in the released state) is more preferably 0.2 µm or less, and further preferably 0.1 µm or less, from the standpoints that gloss and prevention of bronzing of a color image and storage stability of the ink composition are all realized, and a color image further excellent in gloss is obtained.

As the pigment used in the ink composition of the invention, an inorganic pigment and an organic pigment may be used, and these each may be used solely or as a mixture of plural kinds thereof. Examples of the inorganic pigment include titanium oxide and iron oxide, and also include carbon black produced by the known process, such as the contact process, furnace process and the thermal process. Examples of the organic pigment include an azo pigment (such as an azo lake pigment, an insoluble azo pigment, a condensed azo pigment and a chelate azo pigment), a polycyclic pigment (such as a phthalocyanine pigment, a perylene pigment, a perynone pigment, an anthraquinone pigment, a quinacridone pigment, a dioxiane pigment, a thioindigo pigment, an isoindolinone pigment and a quinophthalone pigment), a dye chelate (such as a basic dye chelate and an acidic dye chelate), a nitro pigment, a nitroso pigment and aniline black.

Specific examples of the pigment can be enumerated corresponding to the kind (color) of the ink composition. Examples of the pigment for the yellow ink composition include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180 and 185, which may be used solely or in combination of two or more kinds thereof. Among these, it is preferred to use one kind or two or more kinds selected from the group consisting of C.I. Pigment Yellow 74, 110, 128 and 147. Examples of the pigment for the magenta ink composition include C.I. Pigment Red 5, 7, 12, 48(Ca), 48(Mn), 57(Ca), 57:1, 112, 122, 123, 168, 184, 202, 209, and C.I. Pigment Violet 19, which may be used solely or in combination of two or more kinds thereof. Among these, it is preferred to use one kind or two or more kinds selected from the group consisting of C.I. Pigment Red 122, 202 and 209 and C.I. Pigment Violet 10. Examples of the pigment for the cyan ink composition include C.I. Pigment Blue 1, 2, 3, 15:3, 15:4, 15:34, 16, 22 and 60, and C.I. Vat Blue 4 and 60, which may be used solely or in combination of two or more kinds thereof. Among these, it is preferred to use C.I. Pigment Blue 15:3 and/or 15:4, and it is particularly preferred to use C.I. Pigment Blue 15:3. Examples of the pigment for the black ink composition include an inorganic pigment, such as carbon black (C.I. Pigment Black 7), e.g., furnace black, lamp black, acetylene black and channel black, and an organic pigment, such as aniline black (C.I. Pigment Black 1).

In the case where an organic pigment for a color image is used in the invention, a color image that is particularly improved in glossiness can be formed.

The concentration of the pigment in the ink composition is not particularly limited and is generally 10% by weight or less, and particularly from 1.5 to 3.0% by weight, based on the total weight of the ink composition.

The pigment is preferably such a pigment that has been treated by mixing with the copolymer resin from the standpoints that gloss and prevention of bronzing of a color image and storage stability of the ink composition are all realized, and a color image further excellent in gloss is obtained.

According to the invention, an excellent color image can be obtained even through the pigment that has not been treated is used.

The ink composition of the invention can be prepared in the following manner as similar to the preparation process of the ordinary ink composition. The pigment, an aqueous medium, the copolymer resin of a hydrophobic monomer and a hydrophilic monomer, and the urethane resin are mixed, depending on necessity, with other additives, such as a neutralizing agent, and dispersed with a known dispersing machine to prepare a pigment dispersion liquid, and the pigment dispersion liquid is mixed with an aqueous medium to prepare the ink composition. In the dispersing step, a bead mill or a collision jet pulverizer can be used as similar to the preparation process of the ordinary ink composition. However, since the pigment particles used in the ink composition of the invention necessarily have an average particle diameter (area average particle diameter) of from 150 to 350 nm, it is preferred that the number of treatment in the dispersing step is decreased, or the treating time therein is reduced.

The production process of the pigment dispersion liquid preferably contains a pre-treating step of miniaturizing and uniformizing the particle diameter of the pigment by a kneading treatment, a dispersing step of adding the copolymer resin of a hydrophobic monomer and a hydrophilic monomer and then dispersing the pigment by using a bead mill or a collision-jet pulverizer, and a post-treating step of adding the urethane resin and a crosslinking agent and crosslinking the composition.

It is preferred that after the pre-treating step and before the dispersing step, an alkaline compound is added to the pigment to effect a neutralizing step.

In the dispersing step, it is preferred that the pigment is dispersed with a bead mill or a collision jet pulverizer. The bead mill may be either one capable of finely pulverizing or one of ordinary type. The dispersing treatment is carried out under dispersing condition appropriately adjusted to obtain the aforementioned preferred particle diameter of the copolymer resin. In the dispersing step, an organic solvent may be added upon kneading depending on necessity. The copolymer resin is firmly fixed on the surface of the pigment through the treatment.

After completing the dispersing step, it is preferred that impurities are removed through ion exchange or ultrafiltration, and then the composition is subjected to the post-treating step. An anionic substance including a cationic substance (such as a divalent metallic ion) and an anionic substance can be removed by ion exchange, and substances dissolving impurities (such as a substance remaining after synthesis of the pigment, an excessive component in the dispersion liquid, a resin not adsorbed on the organic pigment, and a contaminating component) can be removed by ultrafiltration. The ion exchange treatment can be carried out by using a known ion exchange resin. The ultrafiltration treatment can be carried out by using a known ultrafiltration membrane, which may be an ordinary type or a double performance type.

In the post-treating step, the urethane resin and the crosslinking agent are added to effect the crosslinking reaction, whereby the copolymer resin and the urethane resin are crosslinked with the crosslinking agent to cover the surface of the pigment (encapsulation). Consequently, the time-lapse stability is improved, the viscosity is lowered, and the adhesion property is improved, so as to stabilize the pigment dispersion.

As the aqueous medium for the pigment dispersion, water is generally used. The water used herein is preferably pure water or extra-pure water, such as ion exchanged water, ultrafiltered water, reverse osmosis water and distilled water. In particular, water obtained through a sterilization treatment, such as ultraviolet ray irradiation and addition of hydrogen peroxide, of these types of water is preferred since growth of fungus and bacteria can be suppressed for a long period of time. Other aqueous media for an ink composition, such as a penetrating solvent, a moistening solvent and a surfactant, may be used as the aqueous medium for the pigment dispersion liquid along with or separate from water.

The pigment dispersion liquid is preferably subjected to an ion exchange treatment or an ultrafiltration treatment, from the standpoints that gloss and prevention of bronzing of a color image and storage stability of the ink composition are all realized, and a color image further excellent in gloss is obtained.

It is preferred that the ink composition is added with an epoxy resin having a glycidyl ether as a skeleton or a resin having an oxazoline group, as a crosslinking agent for the copolymer resin and the urethane resin, from the standpoints that gloss and prevention of bronzing of a color image and storage stability of the ink composition are all realized, and a color image further excellent in gloss is obtained.

The crosslinking agent is preferably a resin capable of reacting with a carboxyl group (i.e., a carboxyl group attacking resin) from the standpoint of further improving the dispersion property. Examples thereof include a polycarbodiimide resin having a carbodiimide group in the molecule, an oxazoline resin having an oxazoline group in the molecule, and an aziridine resin.

The addition amount of the crosslinking agent is preferably from 1 to 50% by weight based on the urethane resin from the standpoints that gloss and prevention of bronzing of a color image and storage stability of the ink composition are all realized, and a color image further excellent in gloss is obtained.

The addition amount of the crosslinking agent is preferably such an amount that provides a gel fraction of 20% or more, and more preferably 35% or more, based on the total carboxyl groups in the copolymer resin and the urethane resin, from the standpoints that gloss and prevention of bronzing of a color image and storage stability of the ink composition are all realized, and a color image further excellent in gloss is obtained.

The effective solid content weight ratio (crosslinking agent/(styrene-acrylic resin+urethane resin)) is preferably from 1/100 to 50/100, and more preferably from 1/100 to 40/100, from the standpoints that gloss and prevention of bronzing of a color image and storage stability of the ink composition are all realized, and a color image further excellent in gloss is obtained.

The weight average molecular weight (Mw) of the urethane resin reacted with the crosslinking agent is preferably 10,000 or more, and more preferably 30,000 or more, from the standpoints that gloss and prevention of bronzing of a color image and storage stability of the ink composition are all realized, and a color image further excellent in gloss is obtained.

As the aqueous medium for the ink composition, water, a penetrating solvent, a moistening solvent and a surfactant may be used. As the water for the ink composition, those similar to the water for the pigment dispersion described before and may be added to the ink composition as the balance after mixing with a penetrating solvent, a moistening solvent or a surfactant.

The penetrating solvent has a function of improving the wettability to the recording medium to improve the penetration property, and from the standpoint of improving the penetration property, an alkanediol compound and/or a glycol ether compound are preferably used.

Examples of the alkanediol compound include 1,2-pentanediol and 1,2-hexanediol.

Examples of the glycol ether compound include ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether.

These penetrating solvents may be used solely or as a mixture of two or more kinds of them.

The penetrating solvent is preferably contained in the ink composition of the invention in an amount of from 1 to 20% by weight, and more preferably from 1 to 10% by weight.

The moistening solvent has a function of, upon using for ink-jet recording, preventing an ink from being dried to prevent clogging of a printing head of an ink-jet printer. A polyhydric alcohol is preferred as the moistening solvent from the standpoint of preventing clogging, and specific examples thereof include ethylene glycol, diethylene glycol, triethylene glycol, polyethylene glycol, polypropylene glycol, propylene glycol, butylene glycol, 1,2,6-hexanetriol, thiodiglycol, hexylene glycol, glycerin, trimethylolethane and trimethylolpropane.

Furthermore, urea, 2-pyrrolidone, N-methyl-2-pyrrolidone, 1,3-diethyl-2-imidazolidine, triethanolamine and a saccharide, such as a sugar alcohol, may also be used as the moistening agent.

The moistening agent is preferably contained in the ink composition of the invention in an amount of from 0.1 to 30% by weight, and more preferably from 0.5 to 20% by weight.

The surfactant has a function of improving the wettability to the recording medium to improve the penetration property, and from the standpoint of improving the penetration property, an acetylene glycol compound and/or a polysiloxane compound are preferably used.

Preferred examples of the acetylene glycol compound include an acetylene glycol compound represented by the following general formula (1).

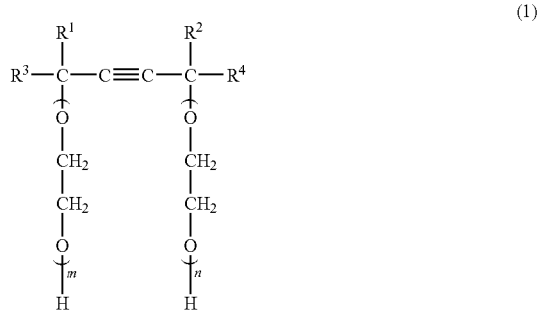

wherein $0 \leq m+n \leq 50$, and $R^1$ to $R^4$ each independently represents an alkyl group having from 1 to 6 carbon atoms.

Examples of the acetylene glycol compound represented by the general formula (1) include commercially available products, such as Olfin Y and Surfynol 82, 440, 465, STG and E1010 (all trade names, produced by Air Products and Chemicals, Inc.), and Surfynol 465 is particularly preferably used.

Preferred examples of the polysiloxane compound include a polyether-modified organosiloxane compound represented by the following general formula (2).

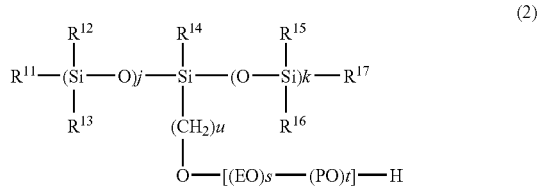

wherein $R^{11}$ to $R^{17}$ each independently represents an alkyl group having from 1 to 6 carbon atoms, j, k and u each independently represents an integer of 1 or more, EO represents an ethyleneoxy group, PO represents a propyleneoxy group, and s and t each independently represents an integer of 0 or more, provided that s+t is an integer of 1 or more, and the orders of EO and PO are not limited within the brackets and may be either a random form or a block form.

Examples of the polysiloxane compound represented by the general formula (2) include commercially available products, such as BYK348 (produced by BYK Chemie Japan Co., Ltd.).

As the surfactant, various kinds of surfactants may be used, such as a cationic surfactant, an anionic surfactant and a nonionic surfactant.

The surfactants may be used solely or as a mixture of two or more of them.

The surfactant is preferably contained in the ink composition of the invention in an amount of from 0.1 to 5.0% by weight, and more preferably from 0.2 to 1.0% by weight.

The ink composition of the invention preferably further contains an organic pH adjusting agent or an inorganic pH adjusting agent, and an alkanolamine compound and an alkylamine compound are particularly preferably used as the pH adjusting agent. The use of the pH adjusting agent not only improves the storage stability of the ink composition, but prevents the ink composition from suffering rapid change in pH on a recording medium to improve the glossiness. In particular, the use of an alkanolamine compound and an alkylamine compound as the pH adjusting agent improves the glossiness to a mirror surface.

Examples of the alkanolamine compound include triethanolamine, monoethanolamine, diethanolamine, dimethylethanolamine and diethylethanolamine.

Examples of the alkylamine compound include triethylamine, monoethylamine, diethylamine, dimethylethylamine and diethylmethylamine.

The pH adjusting agents may be used solely or as a mixture of two or more of them.

The pH adjusting agent is preferably contained in the ink composition of the invention in an amount of from 0.1 to 5.0% by weight, and more preferably from 0.3 to 1.5% by weight.

The ink composition of the invention preferably has pH of 8.0 or more from the standpoints that gloss and prevention of bronzing of a color image and storage stability of the ink composition are all realized, and a color image further excellent in gloss is obtained.

The ink composition of the invention may contain various additives depending on necessity, such as a fixing agent, e.g., water soluble rosin, an antifungul agent and an antiseptic, e.g., sodium benzoate, an antioxidant and an ultraviolet ray absorbent, e.g., alohanate, and a chelating agent. These additives may be used solely or as a mixture of two or more of them.

The ink composition of the invention can be prepared in the similar manner as a conventional ink composition prepared by using a pigment dispersion liquid. Upon preparation of the pigment dispersion liquid, it is preferred to remove coarse particles by using a membrane filter or a mesh filter.

The ink composition of the invention is not limited in purpose thereof, and can be used as ink compositions of various purposes, such as an ink for an ink-jet printer and an ink for a writing instrument, such as a pen. In particular, the ink composition is preferably used for ink-jet recording process, in which droplets of an ink composition are ejected from a nozzle and attached to a recording medium to form an image, such as a character and a graphic form, and is particularly preferably used for on-demand type ink-jet recording process. Examples of the on-demand type ink-jet recording process include a piezoelectric device recording process, in which an image is recorded by using a piezoelectric device equipped in a printer head, and a thermal jet recording process, in which an image is recorded by using thermal energy with a heater of a resistance hating device equipped in a printer head, and the ink composition of the invention can be preferably used in both ink-jet recording processes.

Ink Set

The ink set of the invention contains at least the ink composition of the invention. The use of the ink composition, i.e., the pigment particles having an area average particle diameter of from 150 to 350 nm, provides a recorded image excellent in gloss and sharpness without occurrence of strong glare even when the image receives strong illumination at a short distance. In the case where the ink composition of the invention contains an organic pigment for a color image, a color image that is particularly improved in gloss can be formed.

The number and the kind (color) of the ink compositions contained in the ink set of the invention are not particularly limited, and as the ink compositions, for example, a yellow ink composition, a magenta ink composition, a cyan ink composition and a black-ink composition each may be used solely or as a mixture of plural kinds thereof. Since the ink set of the invention can improve a color image in gloss, the ink set preferably contains at least a chromatic color ink composition, such as a yellow ink composition, a magenta ink composition and a cyan ink composition.

The ink set of the invention is not limited in purpose thereof and can be preferably used for an ink-jet recording process, and the purposes thereof are similar to those of the ink composition of the invention.

While the invention has been described with reference to embodiments thereof, the invention is not limited to the embodiments and may include various modifications without departing from the scope and the spirit thereof. According to the invention, an excellent recording process using the ink composition or the ink set (particularly, an ink-jet recording process) and an excellent recorded image obtained therefrom can also be provided.

EXAMPLES

The present invention will be illustrated in greater detail with reference to the following Examples, but the invention should not be construed as being limited thereto. The "percent", "part" and "ratio" are each given by weight unless otherwise indicated.

Examples 1 to 9 and Comparative Examples 1 to 6

(A) Preparation of Pigment Dispersion Liquids (1) to (9)

Six kinds of pigment dispersion liquids (1) to (6) used for preparation of ink compositions of Examples 1 to 9 and three kinds of pigment dispersion liquids (7) to (9) used for preparation of ink compositions of comparative Examples 1 to 6 were prepared in the following manner.

(1) Preparation of Yellow Pigment Dispersion Liquid (1):

The formulation (1)-A shown below was charged in a pressure kneader and kneaded at room temperature for 10 hours to produce a pigment kneaded product (1)-a.

| Formulation (1)-A | part by weight |
|---|---|
| C.I. Pigment Yellow 74 | 20 |
| Styrene-methylstyrene-acrylic acid copolymer resin (acid value: 160, weight average molecular weight: 8,000, glass transition temperature: 75° C.) | 3 |
| Glycerin | 15 |
| Isopropyl alcohol | 4 |
| Pigment kneaded product (1)-a | 42 in total |

The formulation (1)-B shown below was then charged in an agitator and agitated at 95° C. for 10 hours to produce a pigment preparation before dispersion (1)-b.

| Formulation (1)-B | part by weight |
|---|---|
| Pigment kneaded product (1)-a | 42 |
| Neutralizing agent (triethanolamine) | 3 |
| Ion exchanged water | 55 |
| Pigment preparation before dispersion (1)-b | 100 in total |

The pigment preparation before dispersion (1)-b was charged in a bead mill capable of finely pulverizing (having a function of forming organic pigment fine particles having a diameter of 50 nm) and subjected to 1-pass pulverization to produce a pigment preparation after dispersion (1)-c.

The pigment preparation after dispersion (1)-c was adjusted in pH to 8.5 and subjected to centrifugal separation at 25,000 G for 5 minutes to remove coarse particles, and thus a retreated pigment preparation after dispersion (1)-d. The retreated pigment preparation after dispersion (1)-d had a solid content of 23.0%, pH of 8.3, and a pigment particle diameter (volume 50% diameter) of 350 nm or less.

The following formulation (1)-C was charged in an agitator and agitated at 90° C. for 5 hours to crosslink the resin in the dispersion liquid to obtain a crosslinked preparation (1)-e (hereinafter, referred to as a crosslinking step).

| Formulation (1)-C | part by weight |
|---|---|
| Retreated pigment preparation after dispersion (1)-d | 100 |
| Polyester polyurethane resin (solid content: 30%, acid value: 50, neutralized with triethylamine) | 10 |
| Crosslinking agent (Epoxy resin with 20% of glycidyl ether as skeleton, epoxy equivalent: 200) | 8 |
| Crosslinked preparation (1)-e | 118 in total |

The crosslinked preparation (1)-e had pH of about 8. The preparation was adjusted with ion exchanged water and potassium hydroxide to have a pigment solid content of 10% and pH of about 9, and thus a pigment dispersion liquid (1) was obtained. The pigment dispersion liquid (1) thus obtained had a theoretical charged formulation containing 100 parts of the pigment with about 15 parts of the styrene-methylstyrene-acrylic acid copolymer resin and about 15 parts of the polyester polyurethane resin. The pigment had an area average particle diameter of 250 nm and a volume average particle diameter of 400 nm.

(2) Preparation of Magenta Pigment Dispersion Liquid (2):

The formulation (2)-A shown below was charged in a pressure kneader and kneaded at room temperature for 10 hours to produce a pigment kneaded product (2)-a.

| Formulation (2)-A | part by weight |
|---|---|
| C.I. Pigment Violet 19 | 20 |
| Styrene-methylstyrene-acrylic acid copolymer resin (acid value: 160, weight average molecular weight: 8,000, glass transition temperature: 75° C.) | 2 |
| Glycerin | 15 |
| Isopropyl alcohol | 4 |
| Pigment kneaded product (2)-a | 41 in total |

A pigment preparation before dispersion (2)-b, a pigment preparation after dispersion (2)-c and a retreated pigment preparation after dispersion (2)-d were sequentially produced from the pigment kneaded product (2)-a in the same manner as in the production of the pigment dispersion (1).

The following formulation (2)-B was charged in an agitator and agitated at 90° C. for 5 hours to crosslink the resin in the dispersion liquid to obtain a crosslinked preparation (2)-e.

| Formulation (2)-B | part by weight |
|---|---|
| Retreated pigment preparation after dispersion (2)-d | 100 |
| Polyether polyurethane resin (solid content: 20%, acid value: 50, neutralized with triethylamine) | 10 |
| Crosslinking agent (Epoxy resin with 20% of glycidyl ether as skeleton, epoxy equivalent: 200) | 8 |
| Crosslinked preparation (2)-e | 118 in total |

The crosslinked preparation (2)-e had pH of about 8. The preparation was adjusted with ion exchanged water and potassium hydroxide to have a pigment solid content of 10% and pH of about 9, and thus a pigment dispersion liquid (2) was obtained. The pigment dispersion liquid (2) thus obtained had a theoretical charged formulation containing 100 parts of the pigment with about 10 parts of the styrene-methylstyrene-acrylic acid copolymer resin and about 10 parts of the polyether polyurethane resin. The pigment had an area average particle diameter of 150 nm and a volume average particle diameter of 200 nm.

(3) Preparation of Cyan Pigment Dispersion Liquid (3):

The formulation (3)-A shown below was charged in a pressure kneader and kneaded at room temperature for 10 hours to produce a pigment kneaded product (3)-a.

| Formulation (3)-A | part by weight |
|---|---|
| C.I. Pigment Blue 15:3 | 20 |
| Styrene-methylstyrene-acrylic acid copolymer resin (acid value: 160, weight average molecular weight: 8,000, glass transition temperature: 75° C.) | 4 |
| Glycerin | 15 |
| Isopropyl alcohol | 4 |
| Pigment kneaded product (2)-a | 43 in total |

A pigment preparation before dispersion (3)-b, a pigment preparation after dispersion (3)-c and a retreated pigment preparation after dispersion (3)-d were sequentially produced from the pigment kneaded product (3)-a in the same manner as in the production of the pigment dispersion (1).

The following formulation (3)-B was charged in an agitator and agitated at 90° C. for 5 hours to crosslink the resin in the dispersion liquid to obtain a crosslinked preparation (3)-e.

| Formulation (3)-B | part by weight |
|---|---|
| Retreated pigment preparation after dispersion (3)-d | 100 |
| Polycarbonate polyurethane resin (solid content: 20%, acid value: 50, neutralized with triethylamine) | 20 |
| Crosslinking agent (Epoxy resin with 20% of glycidyl ether as skeleton, epoxy equivalent: 200) | 8 |
| Crosslinked preparation (3)-e | 128 in total |

The crosslinked preparation (3)-e was adjusted with ion exchanged water and potassium hydroxide to have a pigment solid content of 10% and pH of about 9, and thus a pigment dispersion liquid (3) was obtained. The pigment dispersion liquid (3) thus obtained had a theoretical charged formulation containing 100 parts of the pigment with about 20 parts of the styrene-methylstyrene-acrylic acid copolymer resin and about 20 parts of the polycarbonate polyurethane resin. The pigment had an area average particle diameter of 350 nm and a volume average particle diameter of 450 nm.

(4) Preparation of Yellow Pigment Dispersion Liquid (4):

A pigment dispersion liquid (4) was produced by repeating the operations in the production process of the pigment dispersion liquid (2) except that the polyether polyurethane resin was changed to a polycarbonate polyurethane resin, the charged amount thereof was changed to 4 parts by weight, and the pigment was changed to C.I. Pigment Yellow 74. The pigment dispersion liquid (4) thus obtained had a formulation containing 100 parts of the pigment with about 10 parts of styrene-methylstyrene-acrylic acid copolymer resin and about 20 parts of the polycarbonate polyurethane resin. The pigment had an area average particle diameter of 250 nm and a volume average particle diameter of 350 nm.

(5) Preparation of Magenta Pigment Dispersion Liquid (5):

A pigment dispersion liquid (5) was produced by repeating the operations in the production process of the pigment dispersion liquid (2) except that the charged amount of the styrene-methylstyrene-acrylic acid copolymer resin was changed to 4 parts by weight, and the polyether polyurethane resin was changed to a polyester polyurethane resin. The pigment dispersion liquid (5) thus obtained had a formulation containing 100 parts of the pigment with about 20 parts of styrene-methylstyrene-acrylic acid copolymer and about 10 parts of the polyester polyurethane resin. The pigment had an area average particle diameter of 250 nm and a volume average particle diameter of 400 nm.

(6) Preparation of Cyan Pigment Dispersion Liquid (6):

A pigment dispersion liquid (6) was produced by repeating the operations in the production process of the pigment dispersion liquid (3) except that the pigment was changed to C.I. Pigment Blue 76, the polycarbonate polyurethane resin was changed to a polyether polyurethane resin, the crosslinking agent was changed to an oxazoline crosslinking agent (oxazoline equivalent: 200), and the charged amount thereof was changed to 4 parts by weight. The pigment dispersion liquid (6) thus obtained had a formulation containing 100 parts of the pigment with about 20 parts of styrene-methylstyrene-acrylic acid copolymer and about 20 parts of the polyether polyurethane resin. The pigment had an area average particle diameter of 150 nm and a volume average particle diameter of 160 nm.

(7) Preparation of Yellow Pigment Dispersion Liquid (7):

A pigment dispersion liquid (7) was produced by repeating the operations in the production process of the pigment dispersion liquid (1) except that the number of pass on treatment with the bead mill capable of finely pulverizing was changed to 3, and without the crosslinking step, the preparation was adjusted with ion exchanged water and potassium hydroxide to produce a retreated preparation after dispersion having a pigment solid content of 10% and pH of about 9. The pigment had an area average particle diameter of 80 nm and a volume average particle diameter of 95 nm.

(8) Preparation of Magenta Pigment Dispersion Liquid (8):

A pigment dispersion liquid (8) was produced by repeating the operations in the production process of the pigment dispersion liquid (1) except that the pigment was changed to C.I. Pigment Violet 19, the number of pass on treatment with the bead mill capable of finely pulverizing was changed to 3, and without the crosslinking step, the preparation was adjusted with ion exchanged water and potassium hydroxide to produce a retreated preparation after dispersion having a pigment solid content of 10% and pH of about 9. The pigment had an area-average particle diameter of 80 nm and a volume average particle diameter of 95 nm.

(9) Preparation of Cyan Pigment Dispersion Liquid (9):

A pigment dispersion liquid (8) was produced by repeating the operations in the production process of the pigment dispersion liquid (1) except that the pigment is C.I. Pigment Blue 15:3, the number of pass on treatment with the bead mill capable of finely pulverizing was changed to 3, and without the crosslinking step, the preparation was adjusted with ion exchanged water and potassium hydroxide to produce a retreated preparation after dispersion having a pigment solid content of 10% and pH of about 9. The pigment had an area average particle diameter of 80 nm and a volume average particle diameter of 95 nm.

(B) Preparation of Ink Compositions

Ink compositions of Examples 1 to 9 having formulations shown in Table 1 below by using the pigment dispersion liquids (1) to (6).

In Tables 1 and 2 TEA denotes triethanolamine, 1,2-HD denotes 1,2-hexanediol, TEGmBE denotes triethylene glycol monobutyl ether, Gly denotes glycerin, BYK348 denotes a polysiloxane surfactant (produced by BYK Chemie Japan Co., Ltd.), Olfin E1010 denotes an acetylene glycol surfactant (produced by Nisshin Chemical Industry Co., Ltd.), Proxel XL2 denotes an antiseptic produced by ICI Japan Ltd.), and EDTA denotes ethylene diamine tetraacetic acid. In Tables 1 and 2, all numerals denote mixing ratios in terms of percent (%).

TABLE 1

| | Example | | | | | | | | |
|---|---|---|---|---|---|---|---|---|---|
| | 1 Yellow (1) Ratio (%) | 2 Magenta (1) Ratio (%) | 3 Cyan (1) Ratio (%) | 4 Yellow (2) Ratio (%) | 5 Magenta (2) Ratio (%) | 6 Cyan (2) Ratio (%) | 7 Yellow (3) Ratio (%) | 8 Magenta (3) Ratio (%) | 9 Cyan (3) Ratio (%) |
| Gly | 15.50 | 15.00 | 12.50 | 15.50 | 15.00 | 12.50 | 15.50 | 15.00 | 12.50 |
| TEA | 0.90 | 0.90 | 0.90 | 0.90 | 0.90 | 0.90 | 0.90 | 0.90 | 0.90 |
| 1,2-HD | 7.00 | 10.00 | 0.00 | 10.00 | 0.00 | 7.00 | 3.00 | 3.00 | 3.00 |
| TEGmBE | 3.00 | 0.00 | 10.00 | 0.00 | 10.00 | 3.00 | 7.00 | 7.00 | 7.00 |
| BYK348 | 0.30 | 0.30 | 0.30 | 0.30 | 0.30 | 0.30 | 0.30 | 0.30 | 0.30 |
| Olfin E1010 | 0.10 | 0.10 | 0.10 | 0.10 | 0.10 | 0.10 | 0.10 | 0.10 | 0.10 |
| Proxel XL2 | 0.30 | 0.30 | 0.30 | 0.30 | 0.30 | 0.30 | 0.30 | 0.30 | 0.30 |
| EDTA | 0.02 | 0.02 | 0.02 | 0.02 | 0.02 | 0.02 | 0.02 | 0.02 | 0.02 |
| Benzotriazole | 0.05 | 0.05 | 0.05 | 0.05 | 0.05 | 0.05 | 0.05 | 0.05 | 0.05 |
| Pure water | balance | balance | balance | balance | balance | balance | balance | balance | balance |
| Pigment dispersion (1) | 30.00 | | | | | | 70.00 | | |
| Pigment dispersion (2) | | 20.00 | | | | | | 70.00 | |
| Pigment dispersion (3) | | | 15.00 | | | | | | 70.00 |
| Pigment dispersion (4) | | | | 30.00 | | | | | |
| Pigment dispersion (5) | | | | | 20.00 | | | | |
| Pigment dispersion (6) | | | | | | 15.00 | | | |
| Total | 100.00 | 100.00 | 100.00 | 100.00 | 100.00 | 100.00 | 100.00 | 100.00 | 100.00 |

Ink compositions of Comparative Examples 1 to 6 having formulations shown in Table 2 below by using the pigment dispersion liquids (7) to (9).

TABLE 2

| | Comparative Example | | | | | |
|---|---|---|---|---|---|---|
| | 1 Yellow (4) Ratio (%) | 2 Magenta (4) Ratio (%) | 3 Cyan (4) Ratio (%) | 4 Yellow (5) Ratio (%) | 5 Magenta (5) Ratio (%) | 6 Cyan (5) Ratio (%) |
| Gly | 15.50 | 15.00 | 12.50 | 15.50 | 15.00 | 12.50 |
| TEA | 0.90 | 0.90 | 0.90 | 0.90 | 0.90 | 0.90 |

TABLE 2-continued

|  | Comparative Example | | | | | |
|---|---|---|---|---|---|---|
|  | 1<br>Yellow (4)<br>Ratio (%) | 2<br>Magenta (4)<br>Ratio (%) | 3<br>Cyan (4)<br>Ratio (%) | 4<br>Yellow (5)<br>Ratio (%) | 5<br>Magenta (5)<br>Ratio (%) | 6<br>Cyan (5)<br>Ratio (%) |
| 1,2-HD | 7.00 | 10.00 | 0.00 | 3.00 | 3.00 | 3.00 |
| TEGmBE | 3.00 | 0.00 | 10.00 | 7.00 | 7.00 | 7.00 |
| BYK348 | 0.30 | 0.30 | 0.30 | 0.30 | 0.30 | 0.30 |
| Olfin E1010 | 0.10 | 0.10 | 0.10 | 0.10 | 0.10 | 0.10 |
| Proxel XL2 | 0.30 | 0.30 | 0.30 | 0.30 | 0.30 | 0.30 |
| EDTA | 0.02 | 0.02 | 0.02 | 0.02 | 0.02 | 0.02 |
| Benzotriazole | 0.05 | 0.05 | 0.05 | 0.05 | 0.05 | 0.05 |
| Pure water | balance | balance | balance | balance | balance | balance |
| Pigment dispersion (7) | 30.00 |  |  | 70.00 |  |  |
| Pigment dispersion (8) |  | 20.00 |  |  | 70.00 |  |
| Pigment dispersion (9) |  |  | 15.00 |  |  | 70.00 |
| Total | 100.00 | 100.00 | 100.00 | 100.00 | 100.00 | 100.00 |

Evaluation of Properties (1) Production of Recorded Images for Evaluation

The ink compositions prepared in Examples 1 to 9 and Comparative Examples 1 to 6 were charged in ink cartridges of an ink-jet printer (PM900C, produced by Seiko Epson Corp.), respectively, and the ink compositions were printed on ink-jet paper (PM Paper, produced by Seiko Epson Corp.) at a resolution of 720×720 dpi and a duty of 80% (ink weight: 10 to 11 mg/inch$^2$).

In the following measurements, the direction, in which the recorded image to be evaluated was irradiated with light, was perpendicular to the scanning direction Z of the printer head, i.e., the recorded image was irradiated with incident light I in the direction perpendicular to the scanning direction Z, and reflected light R was measured.

(2) Maximum Glossiness

A reflected light intensity at a reflection angle of from 42 to 48° was measured by using an automatic goniophotometer (Model GP-200, produced by Murakami Color Research Laboratory Co., Ltd.) at an incident angle of 45° (slit width; diameter on incident side=1 mm, diameter on reflection side=1.5 mm), a sensitivity of 500, and a tilt angle of 0°. A halogen lamp (12 V, 50 W) as a light source and a ND-10 filter were used, and the voltage applied to the light source was adjusted to obtain a glossiness of the standard plate of 42.5. The maximum value of the reflected light intensity values-measured under the conditions was designated as a maximum glossiness. The reproduction error was ±2.0 or less.

(3) Full Width Glossiness

The full width glossiness was measured by using a glossiness meter PG1M, produced by Nippon Denko Co., Ltd. The recorded image to be evaluated was irradiated with incident light at an incident angle of 60° with respect to the normal line of the recorded product, and the value obtained by accumulating the amount of the reflected light received at 60° was designated as the full width glossiness.

(4) Image Clarity

Measurement was carried out twice for each of the recorded images to be evaluated, by using an image clarity meter ICM-1T, produced by Suga Test Instruments Co., Ltd. with the gain being adjusted on the standard mirror surface plate, and the average value was designated as a value of image clarity.

The value of image clarity was obtained by the following manner. The recorded image to be evaluated irradiated with incident light by using a slit lamp of 6 V and 0.35 A as a light source without a filter at a tilt angle of 0° and an incident angle of 45°. Light reflected by the recorded image to be evaluated at a reflection angle of 45° was made through a moving optical comb having a width of 2 mm, and the fluctuation in amount of light received was applied to the following equation (3) to obtain the value of image clarity.

$$S=(M-m)/(M+m) \times 100 \quad (3)$$

wherein S represents the value of image clarity (%), M represents the maximum wave height, and m represents the minimum wave height.

(5) Gloss Sharpness

A value calculated from the maximum glossiness (R), the full width glossiness (W) and the image clarity (S) according to the following equation (4) was designated as gloss sharpness (C).

$$C=S/(W-R) \quad (4)$$

wherein C represents the gloss sharpness, S represents the image clarity, W represents the full width glossiness, and R represents the maximum glossiness.

The gloss sharpness is an evaluation standard established by the inventors, by which the glossy feeling of an image formed on a recording medium can be evaluated by an objective value in conformity to the visual evaluation with the naked eye. Particularly, even in the case where a glossy recorded image is irradiated with strong illumination at a short distance, a glossy recorded image having desired glossy feeling can be evaluated with good correlativity to the apparent glossy feeling. In other words, the glossy texture can be objectively evaluated with good correlativity to the appearance independently of the strength and distance of the illumination. The value of gloss sharpness is preferably larger.

(6) Results

The results of the evaluation are shown in Table 3 (Examples 1 to 9) and Table 4 (Comparative Examples 1 to 6).

TABLE 3

| | Example | | | | | | | | |
|---|---|---|---|---|---|---|---|---|---|
| | 1 Yellow (1) | 2 Magenta (1) | 3 Cyan (1) | 4 Yellow (2) | 5 Magenta (2) | 6 Cyan (2) | 7 Yellow (3) | 8 Magenta (3) | 9 Cyan (3) |
| Maximum glossiness | 13.7 | 15.8 | 20.2 | 15.2 | 15.9 | 5.6 | 12.5 | 11.7 | 13.9 |
| Full width glossiness (parallel) | 61.8 | 56.6 | 71.0 | 71.0 | 55.1 | 43.1 | 63.4 | 70.8 | 71.0 |
| Image clarity (parallel) | 62.3 | 56.8 | 55.6 | 62.1 | 55.4 | 53.4 | 55.1 | 61.5 | 58.6 |
| Gloss sharpness | 1.29 | 1.39 | 1.09 | 1.11 | 1.41 | 1.42 | 1.08 | 1.04 | 1.03 |

TABLE 4

| | Comparative Example | | | | | |
|---|---|---|---|---|---|---|
| | 1 Yellow (4) | 2 Magenta (4) | 3 Cyan (4) | 4 Yellow (5) | 5 Magenta (5) | 6 Cyan (5) |
| Maximum glossiness | 33.9 | 28.5 | 23.1 | 27.2 | 22.3 | 19.3 |
| Full width glossiness (parallel) | 113.4 | 110.4 | 107.3 | 115.1 | 111.9 | 108.5 |
| Image clarity (parallel) | 61.4 | 50.8 | 40.6 | 60.6 | 54.7 | 49.1 |
| Gloss sharpness | 0.77 | 0.62 | 0.48 | 0.69 | 0.61 | 0.55 |

According to the invention, such a recorded image can be obtained that is prevented from suffering from optical thin film interference to avoid glaring dazzle even when the image receives strong illumination at a short distance, whereby a recorded image excellent in gloss and sharpness can be obtained, and the ink composition of the invention can be used as ink compositions of various purposes, such as an ink for an ink-jet printer and an ink for a writing instrument, such a pen.

While the present invention has been described in detail and with reference to specific embodiments thereof, it will be apparent to one skilled in the art that various changes and modifications can be made therein without departing from the spirit and scope thereof.

This application is based on Japanese Patent Application No. 2004-253835 filed Sep. 1, 2004, the contents thereof being herein incorporated by reference.

What is claimed is:

1. An ink composition comprising a pigment which is C.I. Pigment Blue 76, an aqueous medium, a copolymer resin of a hydrophobic monomer and a hydrophilic monomer, and a urethane resin,
   wherein a weight ratio of the copolymer resin to the urethane resin (copolymer resin/urethane resin) is from 1/2 to 2/1, and
   wherein the pigment has an area average particle diameter of from 150 to 350 nm, wherein the copolymer resin and the urethane resin are crosslinked with an epoxy resin having a glycidyl ether as a skeleton or a resin having an oxazoline group, as a crosslinking agent.

2. The ink composition as claimed in claim 1, wherein the pigment has a volume average particle diameter of from 100 to 600 nm.

3. The ink composition as claimed in claim 1, wherein the copolymer resin is a styrene-(meth) acrylic acid copolymer resin, a styrene-methylstyrene-(meth) acrylic acid copolymer resin, a styrene-maleic acid copolymer resin, a (meth) acrylic acid-(meth)acrylate copolymer resin or a styrene-(meth) acrylic acid-(meth)acrylate copolymer resin, wherein the urethane resin has a urethane bond and optionally an amide bond, and wherein the urethane resin has an acidic group.

4. The ink composition as claimed in claim 1, wherein a weight ratio of a solid content of the pigment to a total solid content of the copolymer resin and the urethane resin (pigment/resins) is from 100/20 to 100/80.

5. The ink composition as claimed in claim 1, wherein the crosslinking agent is a resin capable of reacting with a carboxyl group.

6. The ink composition as claimed in claim 5, wherein the crosslinking agent is added in an amount of from 1 to 50% by weight based on the urethane resin.

7. The ink composition as claimed in claim 1, wherein the ink composition further comprises an alkanolamine compound or an alkylamine compound, as a pH adjusting agent.

8. The ink composition as claimed in claim 7, having pH of 8.0 or more.

9. The ink composition as claimed in claim 1, containing the pigment at a content of 10% by weight or less based on the ink composition.

10. An ink set comprising at least the ink composition as claimed in claim 1.

11. An ink set comprising plural kinds of the ink compositions as claimed in claim 1, the ink compositions each containing the pigment at a content of 3% by weight or less based on the ink compositions.

12. A process for producing an ink composition comprising a pigment which is C.I. Pigment Blue 76, an aqueous medium, a copolymer resin of a hydrophobic monomer and a hydrophilic monomer, and a urethane resin,
   wherein a weight ratio of the copolymer resin to the urethane resin (copolymer resin/urethane resin) is from 1/2 to 2/1,
   wherein the pigment has an area average particle diameter of from 150 to 350 nm, the process comprising
   a pre-treating step of providing the pigment having a volume average particle diameter of from 350 to 600 nm;
   a step of dispersing the pigment by adding the copolymer resin of a hydrophobic monomer and a hydrophilic monomer; and
   a post-treating step of crosslinking the copolymer resin by adding the urethane resin and a crosslinking agent.

13. A recording process comprising a step of forming a recorded image on a recording medium with an ink composition as claimed in claim 1.

14. The recording process as claimed in claim 13, carried out by an ink-jet recording process.

15. A recorded image formed by a recording process as claimed in claim 14.

* * * * *